US011946532B2

(12) United States Patent
Freiholtz et al.

(10) Patent No.: US 11,946,532 B2
(45) Date of Patent: Apr. 2, 2024

(54) DRIVE UNIT FOR AUTOMOTIVE VEHICLE

(71) Applicant: e-AAM Driveline Systems AB, Detroit, MI (US)

(72) Inventors: Mattias Freiholtz, Trollhättan (SE); Tommy Elbing, Trollhättan (SE); Alexander Tylee-Birdsall, Leamington Spa (GB); David Kelly, Leamington Spa (GB); John Burke, Leamington Spa (GB); Jason Allen, Leamington Spa (GB); Thomas Bengtsson, Stenungsund (SE); Michael Klinth, Vargön (SE)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/957,162

(22) Filed: Sep. 30, 2022

(65) Prior Publication Data

US 2023/0133502 A1  May 4, 2023

Related U.S. Application Data

(63) Continuation of application No. PCT/IB2021/052581, filed on Mar. 29, 2021.
(Continued)

(51) Int. Cl.
*B60K 1/00* (2006.01)
*B60K 17/02* (2006.01)
(Continued)

(52) U.S. Cl.
CPC .......... *F16H 37/0813* (2013.01); *B60K 1/00* (2013.01); *B60K 17/20* (2013.01); *F16D 23/12* (2013.01);
(Continued)

(58) Field of Classification Search
CPC ...... F16H 37/0813; F16H 48/22; F16H 47/02; F16H 2057/02034; F16H 2057/02052;
(Continued)

(56) References Cited

U.S. PATENT DOCUMENTS 7,115,058 B2   10/2006   Duncan
7,559,390 B2   7/2009   Marsh et al.
(Continued)

FOREIGN PATENT DOCUMENTS

DE   102006025060 A1   12/2007
GB   2424251   9/2006
(Continued)

OTHER PUBLICATIONS

BOECK—Transmission Unit With at Least One Lamellae Switching Element (Dec. 6, 2007).*
(Continued)

*Primary Examiner* — Tinh Dang
(74) *Attorney, Agent, or Firm* — Reising Ethington P.C.

(57) ABSTRACT

A vehicle drive unit that provides improved power transfer to a differential input member of a differential assembly. The vehicle drive unit is configured with an interlock system that is configured to inhibit the supply of electrical power from a source of electrical power if certain predetermined conditions are not met.

6 Claims, 11 Drawing Sheets

Related U.S. Application Data

(60) Provisional application No. 63/004,427, filed on Apr. 2, 2020.

(51) Int. Cl.

| | | |
|---|---|---|
| *B60K 17/06* | (2006.01) | |
| *B60K 17/16* | (2006.01) | |
| *F16D 23/08* | (2006.01) | |
| *F16D 23/12* | (2006.01) | |
| *F16D 28/00* | (2006.01) | |
| *F16H 37/08* | (2006.01) | |
| *F16H 48/22* | (2006.01) | |
| *F16H 57/02* | (2012.01) | |
| *F16H 57/037* | (2012.01) | |
| *F16D 23/06* | (2006.01) | |

(52) U.S. Cl.
CPC ............. *F16H 48/22* (2013.01); *F16H 57/02* (2013.01); *B60K 2001/001* (2013.01); *B60K 17/06* (2013.01); *F16D 2023/0687* (2013.01); *F16D 23/08* (2013.01); *F16D 2023/123* (2013.01); *F16D 2023/126* (2013.01); *F16D 28/00* (2013.01); *F16H 2057/02034* (2013.01); *F16H 2057/02052* (2013.01)

(58) Field of Classification Search
CPC ........ F16H 2048/02–426; B60K 17/20; B60K 17/06; B60K 2001/001; F16D 23/12; F16D 2023/123
See application file for complete search history.

(56) References Cited

U.S. PATENT DOCUMENTS

| | | |
|---|---|---|
| 7,588,508 B2 | 9/2009 | Marsh et al. |
| 9,862,289 B1 | 1/2018 | Crecelius |
| 9,958,049 B1 | 5/2018 | Sten et al. |
| 10,006,533 B1 | 6/2018 | Strandberg |
| 11,293,534 B2 | 4/2022 | Downs et al. |
| 11,303,183 B2 | 4/2022 | Downs et al. |
| 2007/0087890 A1* | 4/2007 | Hamrin ................ F16H 48/30 475/249 |
| 2009/0032321 A1 | 2/2009 | Marsh et al. |
| 2009/0197728 A1 | 8/2009 | Janson |
| 2012/0058855 A1 | 3/2012 | Sten |
| 2012/0238387 A1 | 9/2012 | Stuart |
| 2014/0252902 A1* | 9/2014 | Binkowski ............ H02K 31/02 310/156.08 |
| 2014/0274528 A1 | 9/2014 | Valente et al. |
| 2016/0097443 A1 | 4/2016 | Larsson |
| 2016/0252171 A1 | 9/2016 | Hederstad et al. |
| 2016/0318419 A1 | 11/2016 | Gavling et al. |
| 2017/0246944 A1 | 8/2017 | Goleski et al. |
| 2018/0236861 A1 | 8/2018 | Jegebris et al. |
| 2019/0113120 A1 | 4/2019 | Sten et al. |

FOREIGN PATENT DOCUMENTS

| | | |
|---|---|---|
| JP | H1042519 A * | 2/1998 |
| WO | WO 2019058230 A1 | 3/2019 |

OTHER PUBLICATIONS

ISR & Written Opinion dated Sep. 29, 2022 from priority International Patent App. No. PCT/IB2021/052581 filed Mar. 29, 2021.

\* cited by examiner

DRIVE UNIT FOR AUTOMOTIVE VEHICLE

CROSS-REFERENCE TO RELATED APPLICATIONS

This application is a bypass continuation of International Patent Application No. PCT/IB2021/052581 filed Mar. 29, 2021, which claims the benefit of U.S. Provisional Patent Application No. 63/004,427 filed Apr. 2, 2020. The disclosure of each of the above-referenced applications is incorporated by reference as if fully set forth in detail herein.

FIELD

The present disclosure relates to a drive unit for an automotive vehicle.

BACKGROUND

There is increasing interest on the part of vehicle manufacturers to incorporate an electrically-operated vehicle drive unit into a vehicle drivetrain to provide a vehicle with a hybrid and/or fully electrically-powered propulsion system. There remains a need in the art for an improved vehicle drive unit. There also remains a need in the art for a manner for connecting high-power electric leads to the motor of the electrically-operated vehicle drive unit.

SUMMARY

This section provides a general summary of the disclosure, and is not a comprehensive disclosure of its full scope or all of its features.

In one form, the present disclosure provides a vehicle drive unit that includes a housing, an input pinion mounted in the housing for rotation about a first axis, a first shaft, a ring gear, a final reduction input gear, a final reduction output gear, a differential assembly and a pair of output shafts. The first shaft is mounted in the housing for rotation about a second axis that is transverse to the first axis. The ring gear is meshingly engaged to the input pinion and is rotationally coupled to the first shaft. The final reduction input gear is rotationally coupled to the first shaft. The final reduction output gear is housed in the housing and is rotatable about an output axis. The differential assembly has a differential input, and a pair of differential outputs. The differential input receives rotary power from the final reduction output gear. Each of the output shafts is rotatably coupled to a corresponding one of the differential outputs.

In another form, the present disclosure provides a vehicle drive unit that includes a housing, an electric motor, a differential assembly, and a transmission. The electric motor is coupled to the housing and has a hollow motor output shaft that is rotatable about an output axis. The differential assembly has a differential input member and a pair of differential output members that are rotatable about the output axis. The transmission is configured to transmit rotary power between the motor output shaft and the transmission input member. The transmission has a first intermediate reduction, a second intermediate reduction, a final reduction, and a transmission coupling. The first intermediate reduction has a first intermediate gear, which is coupled to the motor output shaft, and a second intermediate gear. The second intermediate reduction has a third intermediate gear, which is coupled to the motor output shaft, and a fourth intermediate gear. The final reduction has a drive gear and a driven gear. The driven gear is rotatable about the output axis. The transmission coupling is operable in a first mode in which the third intermediate gear is rotatably coupled to the drive gear and the fourth intermediate gear is rotatably decoupled from the drive gear, and a second mode in which the third intermediate gear is rotatably decoupled from the drive gear and the fourth intermediate gear is rotatably coupled to the drive gear. The driven gear is configured to drive the differential input member.

In yet another form, the present disclosure provides a vehicle drive unit that includes a housing, an electric motor, a power terminal, a cover, an electric lead and a blocking member. The housing has a motor portion that defines a channel and a mounting flange. The electric motor is coupled to the motor portion of the housing. The power terminal is disposed in the channel in the motor portion. The cover is removably coupled to the motor portion to cover at least a portion of the channel to inhibit access to the power terminal. The cover is configured to seat against or proximate the mounting flange when coupled to the motor portion. The electric lead is received in the channel and is electrically coupled to the power terminal. The blocking member is coupled to the motor portion and is movable relative to the motor portion between a first position, which at least partially blocks access of the electric lead to the power terminal through the channel and projects from the motor portion to inhibit the cover from is coupled to the motor portion, and a second position which permits access of the electric lead to the power terminal through the channel and is oriented to permit the cover to be coupled to the motor portion.

Optionally, the vehicle drive unit can further comprise a differential assembly, a pair of shafts and a transmission. The differential assembly is received in the housing and has a differential input member and a pair of differential output members. Each of the shafts is driven by a respective one of the differential output members. The transmission is disposed in the housing and transmits rotary power between the electric motor and the differential input member.

In still another form, the present disclosure provides a method for assembling a vehicle drive unit. The vehicle drive unit has a housing, an electric motor, and a power terminal. The housing has a motor portion that defines a channel and a mounting flange. The electric motor is coupled to the motor portion of the housing. The power terminal is disposed in the channel in the motor portion. The method includes: providing a blocking member that is coupled to the motor portion of the housing. The blocking member is movable between a first position, which inhibits access to the power terminal through the channel and projects into a location that inhibits installation of a cover to the motor portion of the housing, and a second position that permits access to the power terminal through the channel and which clears the location to permit installation of the cover to the motor portion of the housing. The blocking member is biased into the first position; moving the blocking member from the first position to the second position while inserting an electric lead through the channel to route the electric lead through the channel and to the power terminal; coupling the electric lead to the power terminal, wherein retention of the electric lead in the channel inhibits movement of the blocking member from the second position to the first position; and with the blocking member in the second position, installing the cover to the motor portion of the housing.

Optionally, the vehicle drive unit can include a differential assembly, a pair of shafts and a transmission. The differential assembly is received in the housing and has a differential input member and a pair of differential output members. Each of the shafts is driven by a respective one of the differential output members. The transmission is disposed in the housing and transmits rotary power between the electric motor and the differential input member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
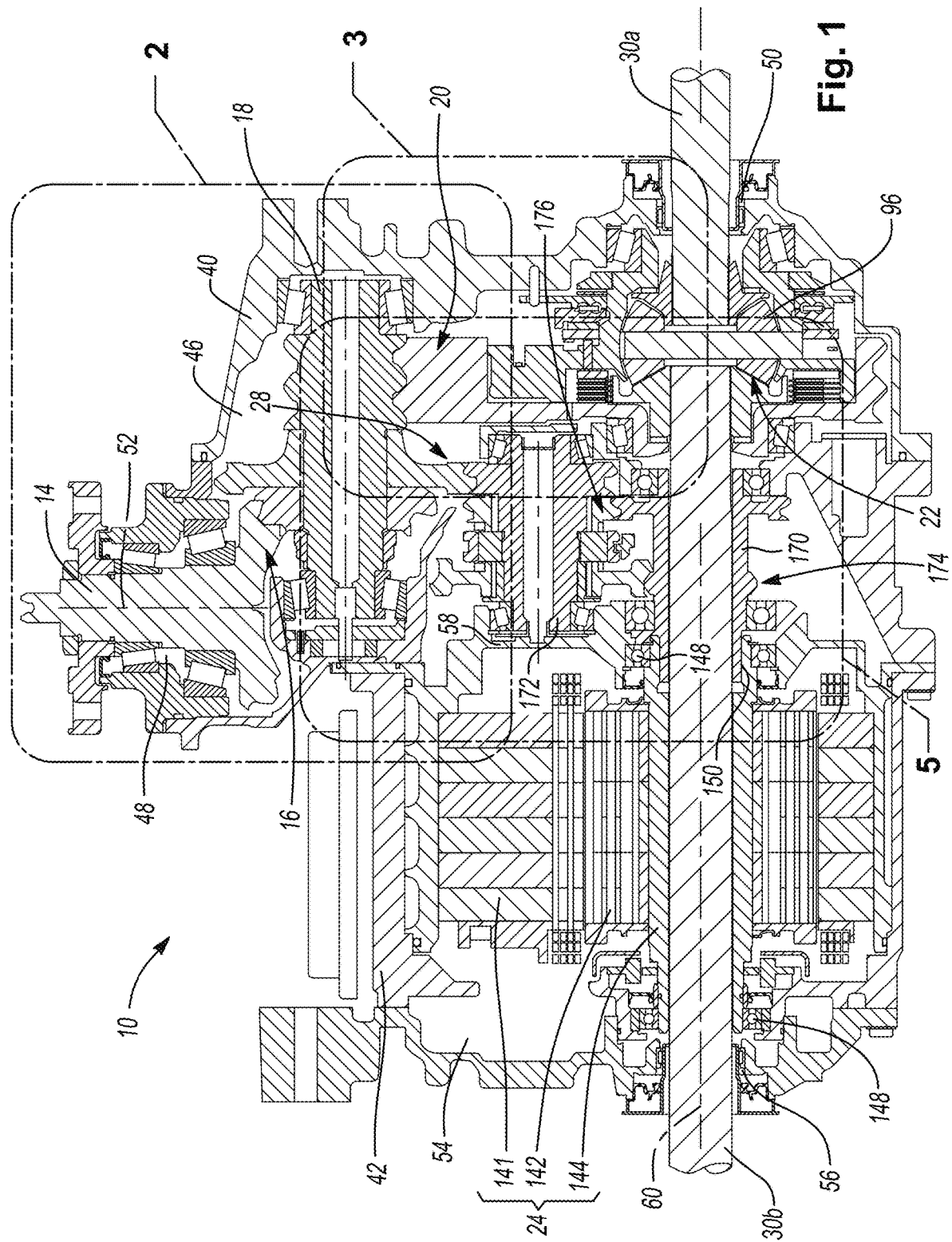
FIG. 1 is a cross-sectional view of an exemplary vehicle drive unit constructed in accordance with the teachings of the present disclosure.
Figure 11:
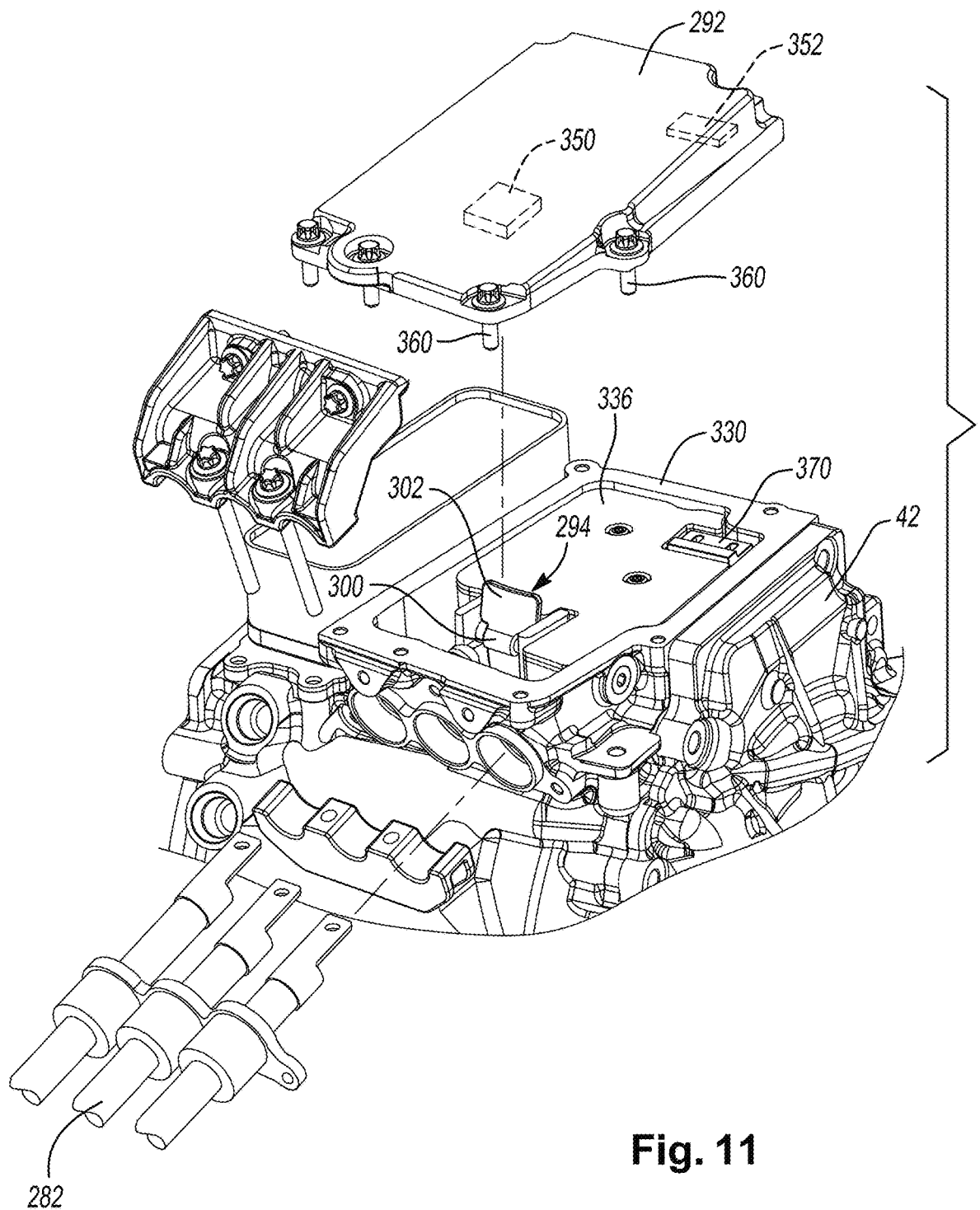
Figure 12:
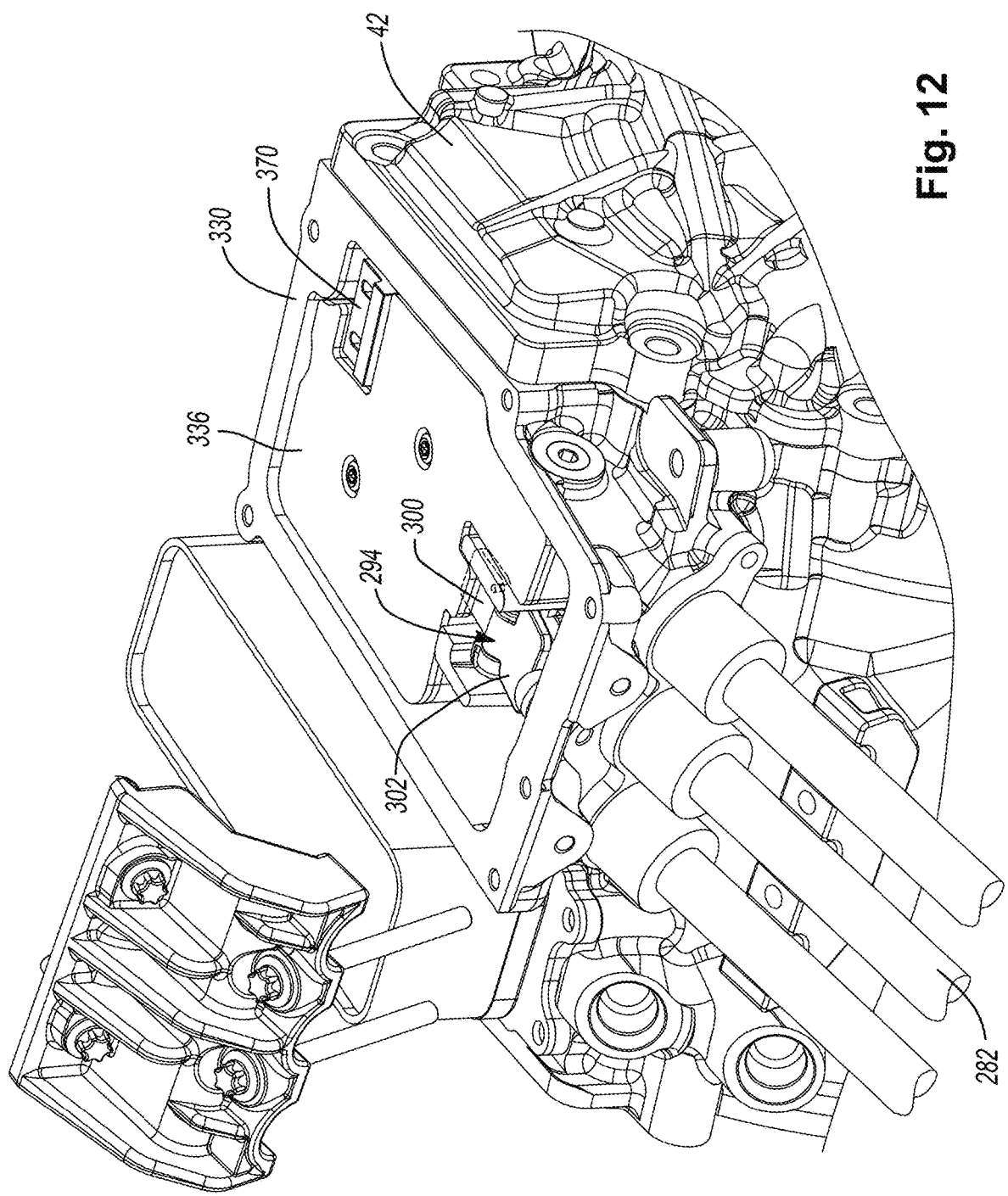

FIG. 11 is an exploded perspective view of a portion of the vehicle drive unit of FIG. 1 illustrating portions of the interlock in a condition that inhibits the installation of the cover to the housing when the electric leads are not first coupled to respective power terminals; and FIG. 12 is an exploded perspective view of the drive unit of FIG. 1 illustrating the interlock in a condition that permits the installation of the cover to the housing.

Corresponding reference numerals indicate corresponding parts throughout the several views of the drawings.

DETAILED DESCRIPTION

With reference to FIG. 1, an exemplary vehicle drive unit is generally indicated by reference numeral 10. The vehicle drive unit 10 can include a housing assembly 12, an input shaft 14, a first fixed reduction 16, a first shaft 18, a second fixed reduction (final reduction) 20, a differential assembly 22, an auxiliary power source 24, a multi-speed transmission 26, a third fixed reduction 28 and a pair of output shafts 30a, 30b.

The housing assembly 12 can include a gearbox portion 40 and a motor portion 42 that can fixedly coupled to one another. The gearbox portion 40 can be formed of one or more components and defines a gearbox cavity 46, an input bore 48 and a first output bore 50. The input bore 48 is disposed about a first axis 52. The first output bore 50 intersects the gearbox cavity 46 and extends through an exterior lateral side of the gearbox portion 40. The motor portion 42 can likewise be formed of one or more components and defines a motor cavity 54 and a second output bore 56, which intersects the motor cavity 54 and extends through an exterior lateral side of the motor portion 42. An interior annular wall 58 of the motor portion 42 segregates the motor cavity 54 from the gearbox cavity 46. The first and second output bores 50 and 56 are disposed about a second axis (output axis) 60.

Figure 2:
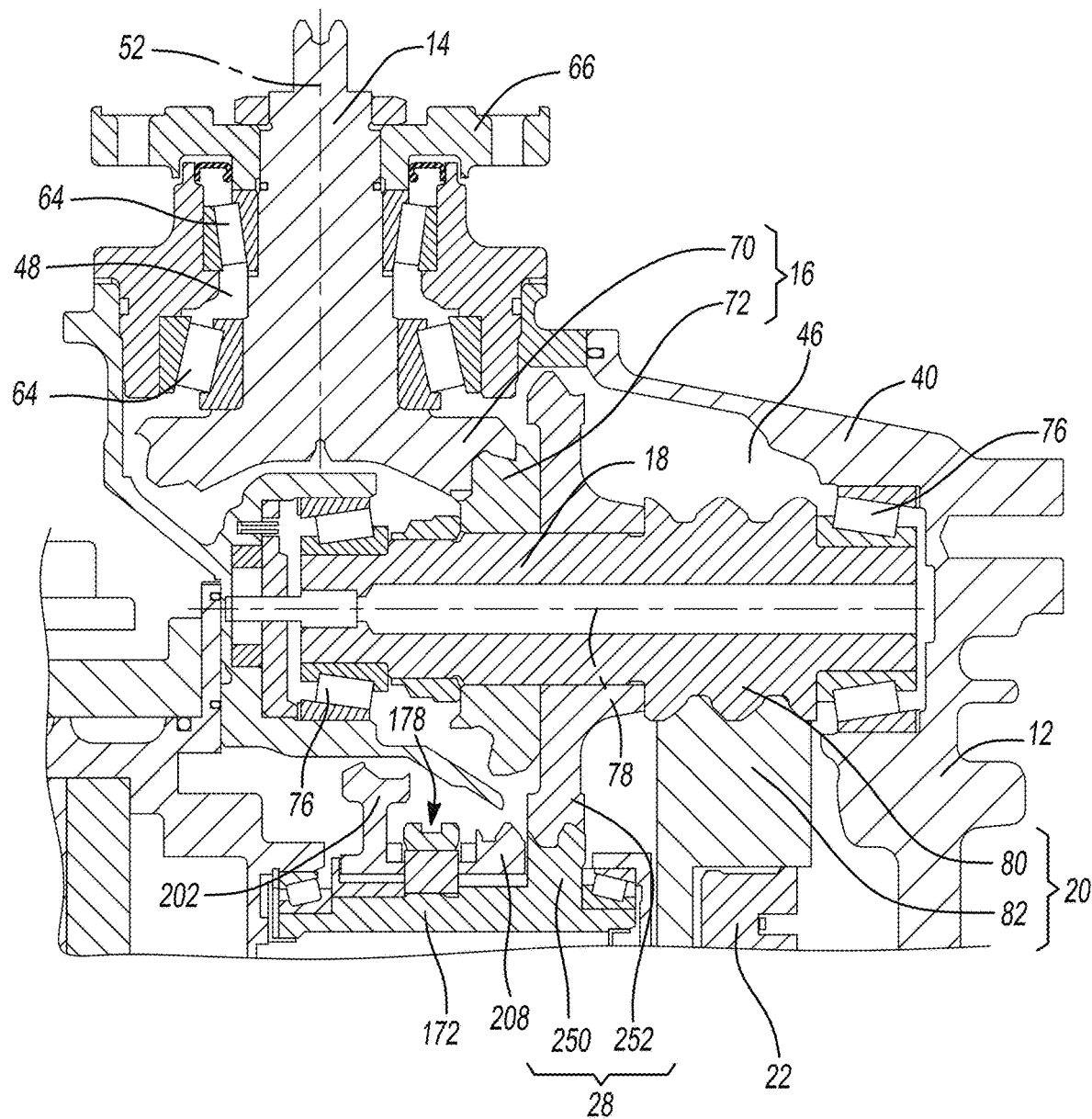
FIGS. 2 and 3 are enlarged portions of FIG. 1.

With reference to FIG. 2, the input shaft 14 is received into the input bore 48 and is supported for rotation relative to the gearbox portion 40 for rotation about the first axis 52 via a set of input shaft bearings 64. The input shaft bearings 64 are depicted as being tapered roller bearings, but it will be appreciated that various other types of bearings, such as one or more angular contact bearings, could be employed in the alternative to support the input shaft 14 for rotation relative to the housing assembly 12. A flange 66 is fixedly coupled to the input shaft 14 and is configured to be coupled to a propshaft (not shown). It will be appreciated that the propshaft could receive rotary power from a conventional powertrain (i.e., an assembly of an internal combustion engine, a transmission and optionally a torque converter).

The first fixed reduction 16, the first shaft 18 and the second fixed reduction 20 are received in the gearbox cavity 46 and cooperate to transmit rotary power from the input shaft 14 to the differential assembly 22. The first fixed reduction 16 could be configured with any type of gears, such as spur or helical gears, but in the example provided the first fixed reduction 16 comprises a bevel pinion (input pinion) 70 and a bevel ring gear (ring gear) 72 that are formed as spiral bevel gears. It will be appreciated that the bevel pinion 70 and the bevel ring gear 72 could be formed as straight bevel gears or as a hypoid gearset in the alternative. The bevel pinion 70 is fixedly coupled to (e.g., integrally and unitarily formed with) the input shaft 14 and as such, rotates with the input shaft 14 about the first axis 52. The bevel ring gear 72 is meshingly engaged with the bevel pinion 70 and is rotationally coupled to the first shaft 18.

The first shaft 18 is supported by a set of first shaft bearings 76 for rotation about a first intermediate axis 78 relative to the housing assembly 12. The first intermediate axis 78 is parallel to but offset from the second axis 60 (FIG. 1).

The second fixed reduction 20 can include an intermediate output gear 80 (final reduction input gear) and a differential input gear (final reduction output gear) 82 that is meshingly engaged to the intermediate output gear 80. In the example provided, the intermediate output gear 80 is a helical gear that is fixedly coupled to (e.g., integrally and unitarily formed with) the first shaft 18 for rotation about the first intermediate axis 78, while the differential input gear 82 is a helical gear that is rotatable about the second axis 60 (FIG. 1).

Figure 3:
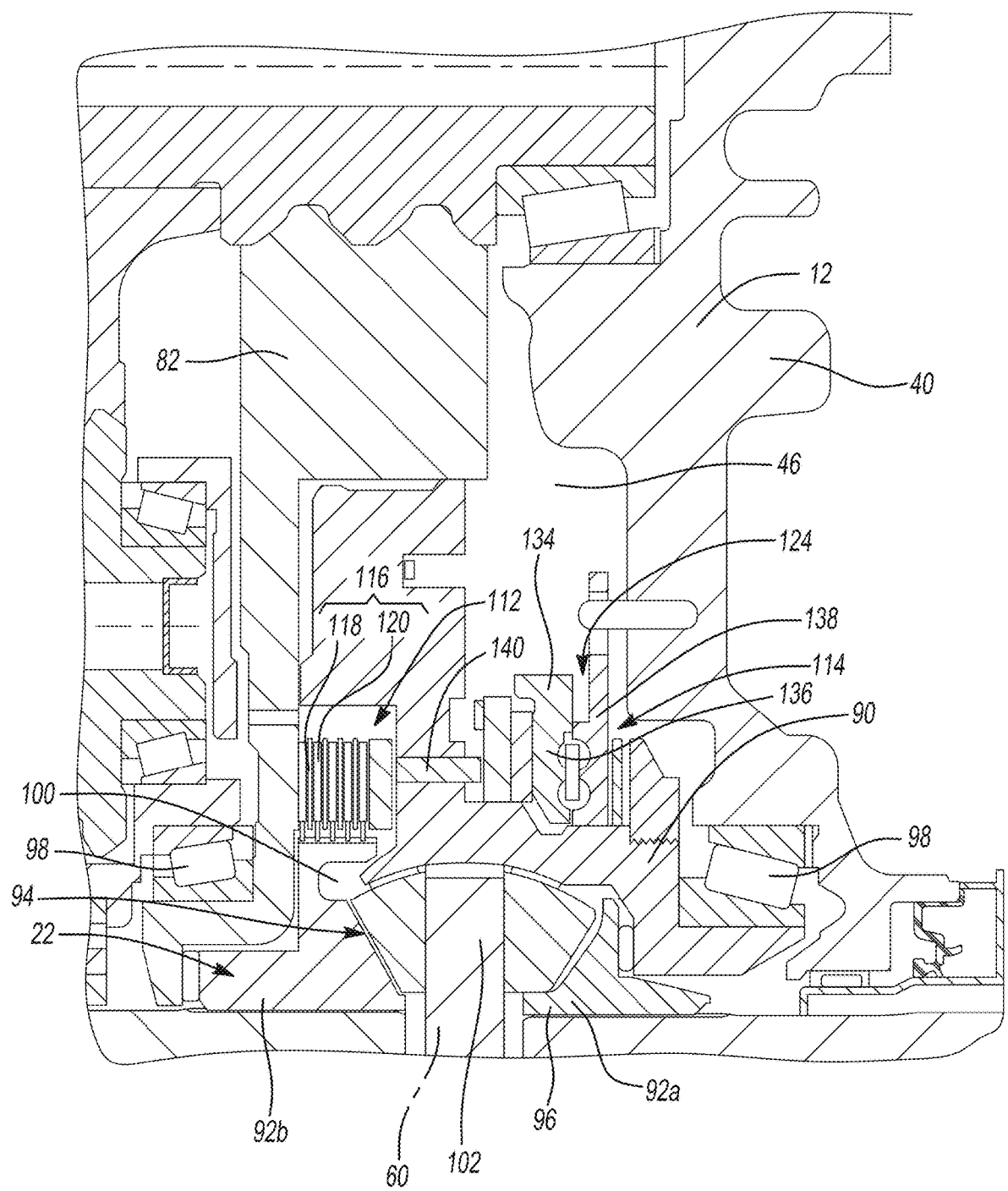

In FIG. 3, the differential assembly 22 is received in the gearbox cavity 46 and can include a differential input member 90, a pair of differential output members 92a, 92b and any desired means for transmitting rotary power from the differential input member 90 and the differential output members 92a, 92b, such as one or more friction clutches or a differential gearset. In the example provided, the differential assembly 22 comprises a differential gearset 94 having a pair of differential pinions 96 and a pair of side gears, and the side gears are the differential output members 92a, 92b. The differential input member 90 is coupled to the differential input gear 82 for common rotation about the second axis 60. A set of differential bearings 98 support the differential input member 90 for rotation relative to the housing assembly 12. In the example shown, the set of differential bearings 98 is mounted directly to the differential input member 90 and the housing assembly 12, but it will be appreciated that the set of differential bearings 98 could be directly mounted to the differential input gear 82 and the housing assembly 12. The differential input member 90 defines a gearset cavity 100 into which the differential gearset 94 is received. Each of the differential pinions 96 is coupled to the differential input member 90 for rotation therewith about the second axis 60, and are rotatable relative to the differential input member 90 about respective differential pinion axes. For example, the differential pinions 96 could be rotatably mounted on one or more pins 102, and each of the pins 102 can have a first end, which is coupled to the differential input member 90, and a second end that is either connected to the differential input member 90 or to another one of the pins 102. Alternatively, each of the differential pinions 96 could include a journal portion (not shown) that is rotatably mounted to the differential input member 90. The side gears (differential output members 92a, 92b) are received in the gearset cavity 100 and are meshingly engaged to the differential pinions 96. The side gears are rotatable relative to the differential input member 90 about the second axis 60.

Optionally, the differential assembly 22 can be configured with a limited slip mechanism 110 that is operable for inhibiting or limiting a speed differential between the differential output members 92a, 92b. In the example provided, the limited slip mechanism 110 includes a friction clutch 112 and an actuator 114. The friction clutch 112 can have a clutch pack 116 that can include a plurality of first clutch plates 118, which can be non-rotatably but axially slidably coupled to the differential input member 90, and a plurality of second clutch plates 120 that are interleaved with the first clutch plates 118 and non-rotatably but axially slidably coupled to the differential output member 92b. Alternatively, the limited slip mechanism 110 could comprise a dog clutch (not shown) that is selectively operable for non-rotatably coupling one of the differential output members 92a, 92b to the differential input member 90. Additionally, or alternatively, a disconnect clutch (not shown) for selectively inhibiting the transmission of rotary power between the differential input gear 82 and one or both of the output shafts 30a, 30b. The disconnect clutch could be any type of clutch or coupling and can be operable for selectively rotationally de-coupling various torque-transmitting elements, such as the differential input gear 82 and the differential input member 90, or one of the differential output members 92a, 92b and a respective one of the output shafts 30a, 30b, from one another.

Figure 4:
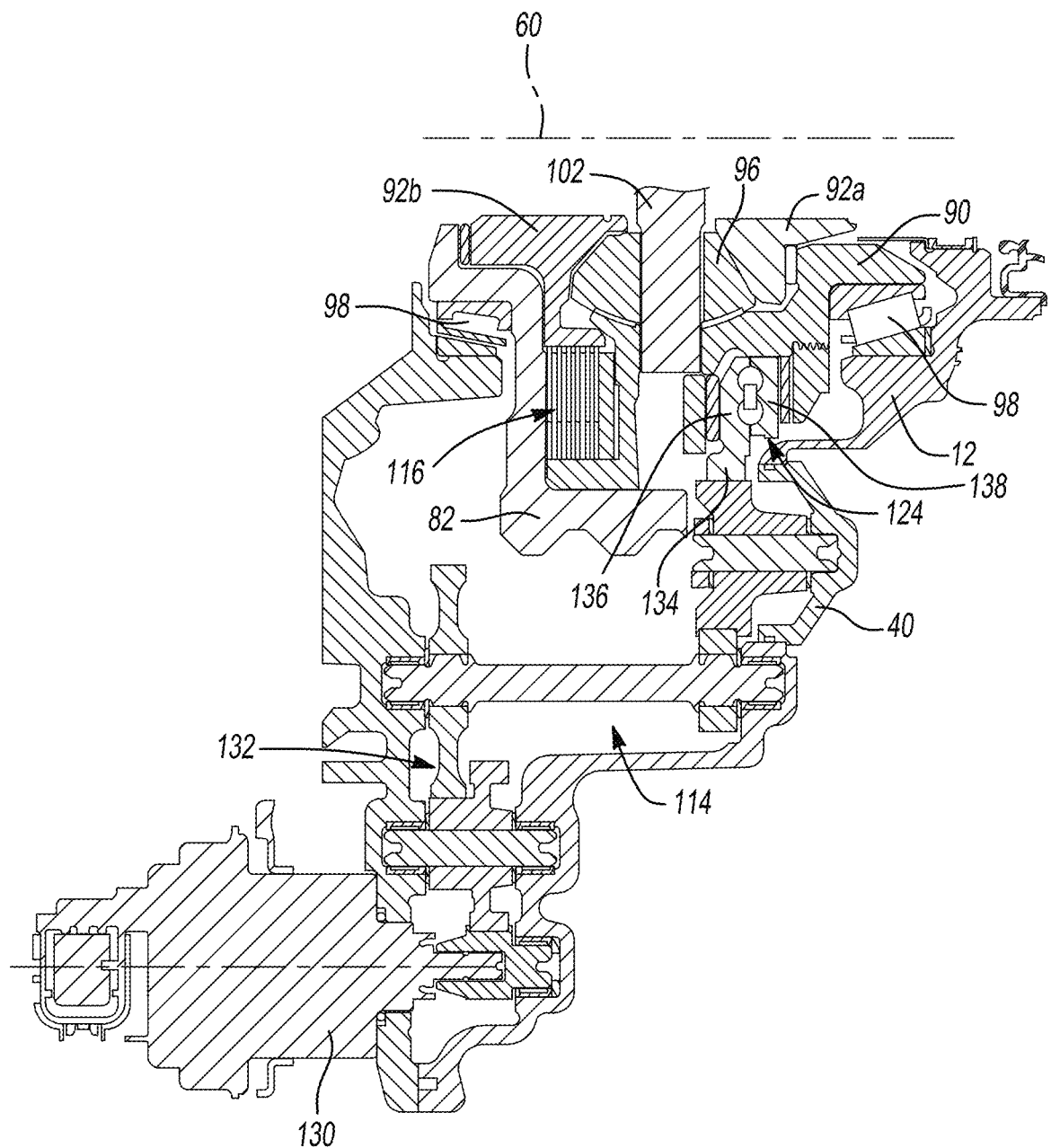
FIG. 4 is a section view of a portion of the vehicle drive unit of FIG. 1, the view illustrating a portion of the differential assembly including a limited slip mechanism and an actuator for operating the limited slip mechanism.

With reference to FIGS. 3 and 4, the actuator 114 is configured to compress the clutch pack 116 to frictionally engage the first and second clutch plates 118 and 120 to one another by an amount that varies with the force that is applied by the actuator 114 to compress the clutch pack 116. In the example provided, the actuator comprises a ball-ramp mechanism 124 that is driven by an actuator motor 130. The actuator motor 130 can be employed to transmit rotary motion through an actuator transmission 132 having a sector gear 134 that is rotationally coupled to a rotatable ball-ramp ring 136 of the ball-ramp mechanism 124. Rotation of the rotatable ball-ramp ring 136 relative to a rotationally stationary ball-ramp ring 138 of the ball-ramp mechanism 124 causes movement of balls (not specifically shown) in the ball-ramp mechanism 124 in a grooved track (not specifically shown) to selectively expand or contract the axial width of the ball-ramp mechanism 124. When the axial width of the ball-ramp mechanism 124 is expanded, pins 140 that extend through the differential input member 90 axially between the ball-ramp mechanism 124 and the clutch pack 116 transmit a force that tends to compress the clutch pack 116, which has the effect of tending to inhibit speed differentiation between the differential output members 92a, 92b. It will be appreciated that limited slip mechanisms and actuators for operating limited slip mechanisms are well known in the art and as such, the limited slip mechanism 110 and/or the actuator 114 could be constructed differently from what is depicted herein.

Returning to FIG. 1, the auxiliary power source 24 is an electric motor and is housed in the motor portion 42 of the housing assembly 12. The auxiliary power source 24 can include a stator 141, which can be fixedly coupled to the housing assembly 12, a rotor 142, which is received in the stator 141 and which is rotatable relative to the stator 141 about the second axis 60, and a motor output shaft 144 that is hollow and coupled to the rotor 142 for rotation therewith about the second axis 60. A set of motor bearings 148 can be employed to support the motor output shaft 144 for rotation relative to the housing assembly 12. The motor output shaft 144 can extend through the interior annular wall 58 into the gearbox cavity 46 and can have a toothed or splined segment, such as an internally splined segment 150.

Figure 5:
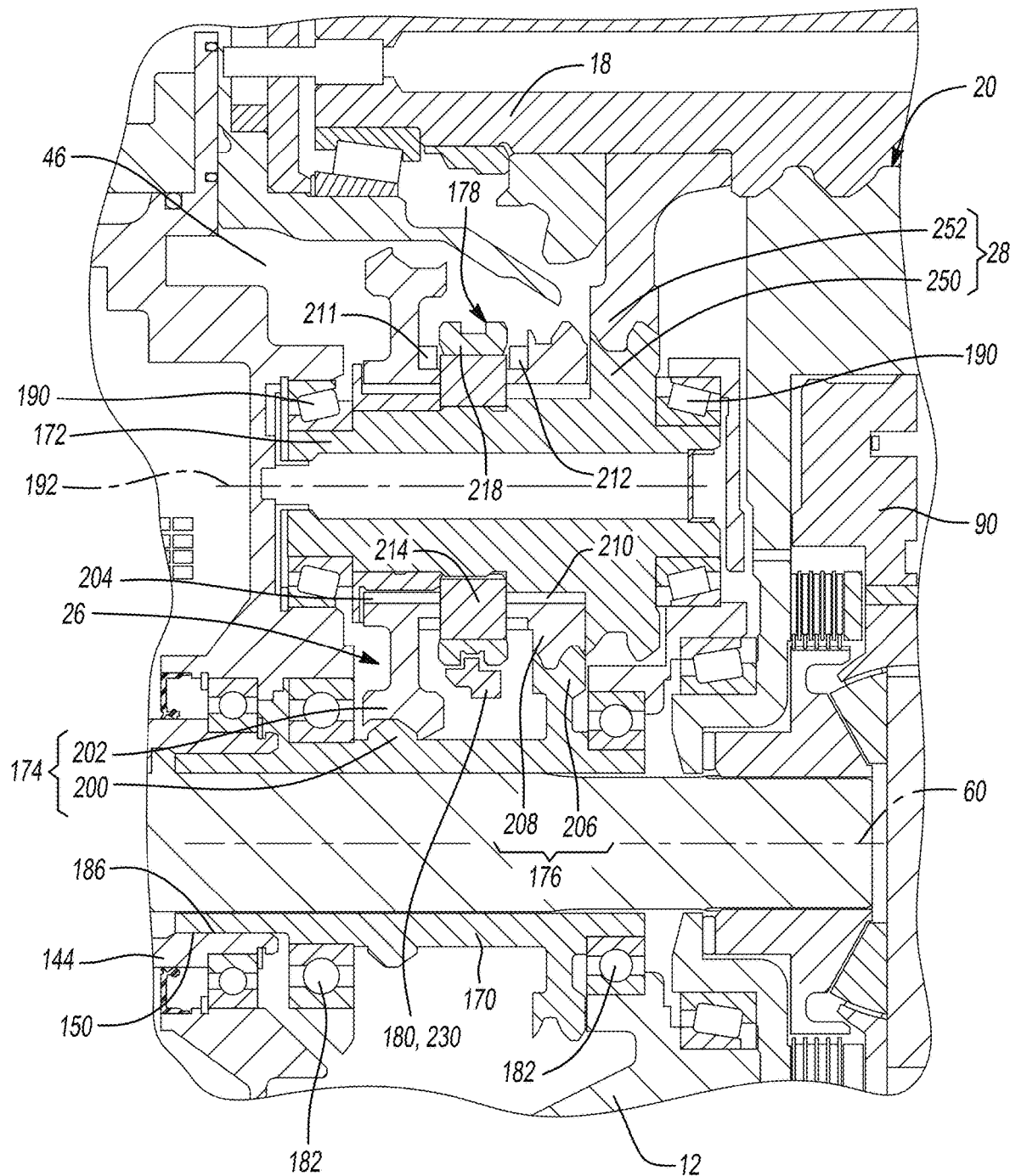
FIG. 5 is an enlarged portion of FIG. 1.

With reference to FIG. 5, the multi-speed transmission 26 is received in the gearbox cavity 46 and can include a second shaft 170, a third shaft 172, a first intermediate gear reduction 174, a second intermediate gear reduction 176, a coupling 178, and an actuator 180. The second shaft 170 is a hollow structure that is mounted on a set of second shaft bearings 182 to support the first shaft 18 for rotation about the second axis 60 relative to the housing assembly 12. The second shaft 170 can be coupled to the motor output shaft 144 for rotation therewith about the second axis 60. In the example provided, the second shaft 170 includes an externally splined segment 186 that is received into and rotationally engaged with the internally splined segment 150 in the motor output shaft 144. A set of third shaft bearings 190 supports the third shaft 172 for rotation relative to the housing assembly 12 about a second intermediate axis 192. The second intermediate axis 192 is parallel to but offset from both the first axis 52 and the second axis 60. Groups of two or more of the first axis 52, the first intermediate axis 78, the second axis 60 and the second intermediate axis 192 can be disposed in a plane with one another. For example, the first axis 52 and the first intermediate axis 78 can be disposed in one plane, and the second axis 60 and the second intermediate axis 192 can be disposed in another plane.

The first intermediate gear reduction 174 comprises a first intermediate gear 200, which is fixedly coupled to (e.g., unitarily and integrally formed with) the second shaft 170, and a second intermediate gear 202 that is meshingly engaged to the first intermediate gear 200 and which is rotatably disposed on the third shaft 172. In the example provided, the first and second intermediate gears 200 and 202 are helical gears and a bearing 204 is disposed between the second intermediate gear 202 and the third shaft 172. The second intermediate gear reduction 176 comprises a third intermediate gear 206, which is fixedly coupled to (e.g., unitarily and integrally formed with) the second shaft 170, and a fourth intermediate gear 208 that is meshingly engaged to the second intermediate gear 202 and which is rotatably disposed on the third shaft 172. In the example provided, the third and fourth intermediate gears 206 and 208 are helical gears and a bearing 210 is disposed between the fourth intermediate gear 208 and the third shaft 172. The first intermediate gear reduction 174 has a first gear ratio, while the second intermediate gear reduction 176 has a second gear ratio that is different from the first gear ratio.

The coupling 178 is configured to selectively couple one of the second and fourth intermediate gears 202 and 208 to the third shaft 172 for common rotation about the second intermediate axis 192. The coupling 178 could be configured in any desired manner, but in the example provided, the coupling 178 comprises a set of first coupling teeth 211, which are formed on the second intermediate gear 202, a set of second coupling teeth 212, which are formed on the fourth intermediate gear 208, a coupling lug 214, which is fixedly coupled to the third shaft 172 and which has a set of third coupling teeth (not specifically shown), and a coupling collar 218 having a set of internal coupling teeth (not specifically shown) that are non-rotatably but axially slidably engaged with the third coupling teeth on the coupling lug 214. The coupling collar 218 is movable along the second intermediate axis 192 between a low-speed position, in which the internal coupling teeth on the coupling collar 218 are meshingly engaged to the first coupling teeth 211 on the second intermediate gear 202 and the third coupling teeth on the coupling lug 214, a high-speed position in which the internal coupling teeth on the coupling collar 218 are meshingly engaged to the second coupling teeth 212 on the fourth intermediate gear 208 and the third coupling teeth on the coupling lug 214, and a neutral position, in which the internal coupling teeth are meshingly engaged to only the third coupling teeth on the coupling lug 214 but are not engaged to either the first coupling teeth 211 on the second intermediate gear 202 or the second coupling teeth 212 on the fourth intermediate gear 208. It will be appreciated that placement of the coupling collar 218 in the low-speed position rotationally couples the second intermediate gear 202 to the third shaft 172 so that the first intermediate gear reduction 174 is active in transmitting rotary power between the second and third shafts 170 and 172, that placement of the coupling collar 218 in the high-speed position rotationally couples the fourth intermediate gear 208 to the third shaft 172 so that the second intermediate gear reduction 176 is active in transmitting rotary power between the second and third shafts 170 and 172, and that placement of the coupling collar 218 in the neutral position couples neither of the second and fourth intermediate gears 202 and 208 to the third shaft 172 so that neither of the first and second intermediate gear reductions 174 and 176 is active.

The actuator 180 can comprise any desired means for selectively translating the coupling collar 218 along the second intermediate axis 192 between the low-speed position, the neutral position and the high-speed position. In the example provided, the actuator 180 is of a type that includes a motor driven fork and is well known in the art. As such, a detailed discussion of the actuator 180 need not be provided herein. Briefly, the actuator 180 includes a fork 230, which is received into a circumferentially extending groove formed in the coupling collar 218 so that the fork 230 is axially but non-rotationally coupled to coupling collar 218, and a rotary electric motor (not specifically shown) is employed to drive a cam (not specifically shown) that cooperates with a cam follower (not specifically shown) to cause translation of the fork 230 along the second intermediate axis 192.

With reference to FIGS. 2 and 5, the third fixed reduction 28 can include a fifth intermediate gear 250 that can be fixedly coupled to (e.g., unitarily and integrally formed with) the third shaft 172, and a sixth intermediate gear 252 that can be meshed with the fifth intermediate gear 250 and rotationally coupled to the first shaft 18. In the example provided, the fifth and sixth intermediate gears 250 and 252 are helical gears.

The auxiliary power source 24 (FIG. 1) can be operated to provide rotary power that drives the differential input member 90 about the second axis 60. Power output from the auxiliary power source 24 (FIG. 1) through the motor output shaft 144 is transmitted through the multi-speed transmission 26 and the third fixed reduction 28 to the first shaft 18 to drive the differential input member 90 through the second fixed reduction 20.

In FIG. 1, each of the output shafts 30a, 30b can be rotationally coupled to an associated one of the differential output members 92a, 92b. The output shaft 30a can exit the housing through the first output bore 50, while the output shaft 30b can extend through the second shaft 170 and the motor output shaft 144 and can exit the housing assembly 12 through the second output bore 56

Figure 6:
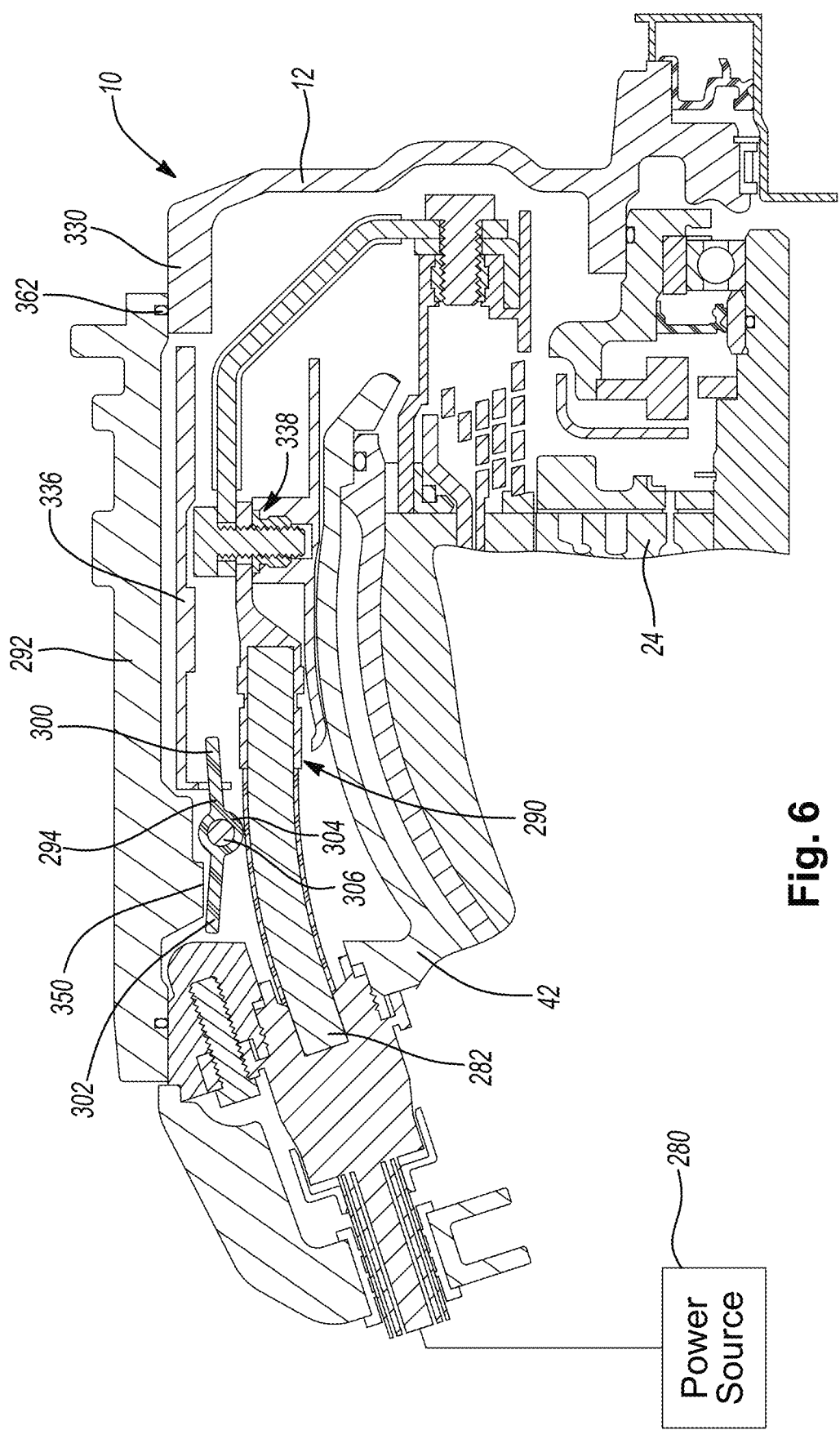
FIG. 6 is a section view of a portion of the vehicle drive unit of FIG. 1, the view illustrating a portion of an interlock that requires the meeting of a set of predetermined conditions before electrical power is provided to a set of electric leads from a source of electrical power.

With reference to FIG. 6, the vehicle drive unit 10 can be coupled to a relatively high-voltage, high-current electrical power source 280 via a plurality of high-power battery leads (electric leads) 282 (only one shown). The vehicle drive unit 10 can include an interlock that is configured to inhibit the supply of electrical power from the auxiliary power source 24 if certain predetermined conditions are not met. For example, the interlock can be configured to require a battery lead 282 that couples the auxiliary power source 24 to a desired electrical ground be present in a channel 290 in the motor portion 42 of the housing assembly 12, and that a cover 292 can be installed to the motor portion 42.

Figure 7:
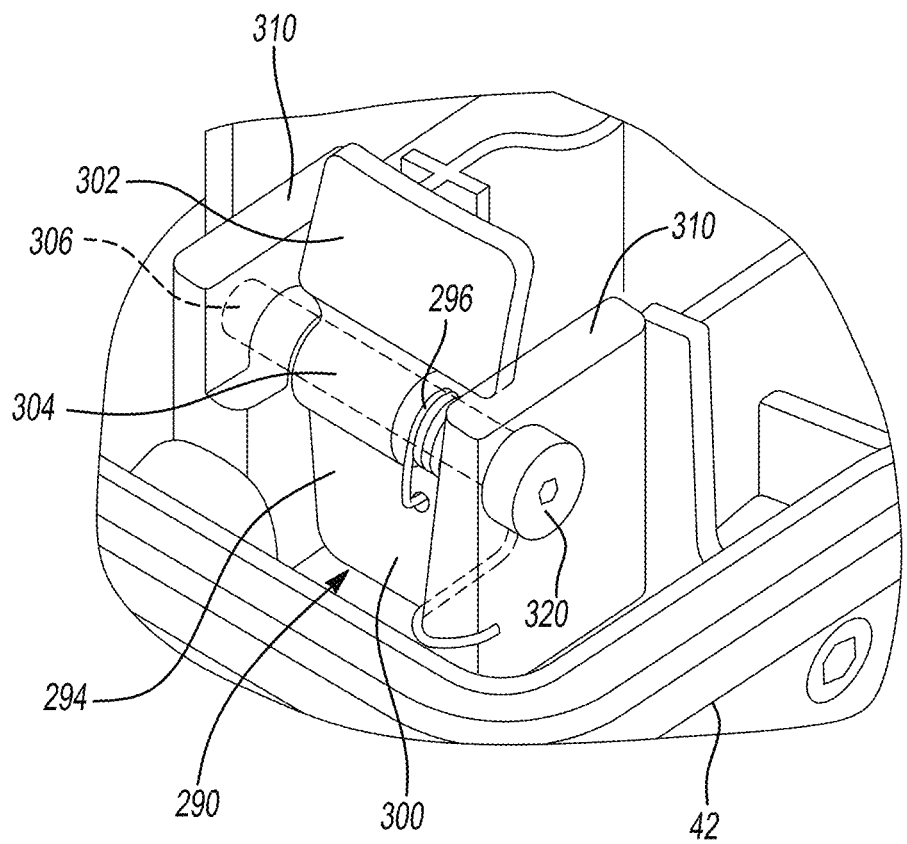
FIGS. 7 and 8 are perspective views that depict a blocking member of the interlock that moves to provide access within a channel for the electric lead and to also permit the assembly of a cover to a housing of the vehicle drive unit.

With reference to FIGS. 6 and 7, a movable blocking member can be employed to both block entry into one or more of the channels 290 from a location outside the motor portion 42, and b) can be disposed in a location that inhibits the seating of the cover 292 against the motor portion 42 when a battery lead or leads 288 is/are not present in the channels 290. In the example provided, the blocking member comprises a lever 294 can be pivotally coupled to the motor portion 42 of the housing assembly 12 and a torsion spring 296 biases the lever 294 into a position that a) blocks entry into a single one of the channels 290 from a location outside the motor portion 42, and b) is disposed in a location that inhibits the seating of the cover 292 against the motor portion 42 when the respective battery lead 282 is not present in the single one of the channels 290.

Figure 8:
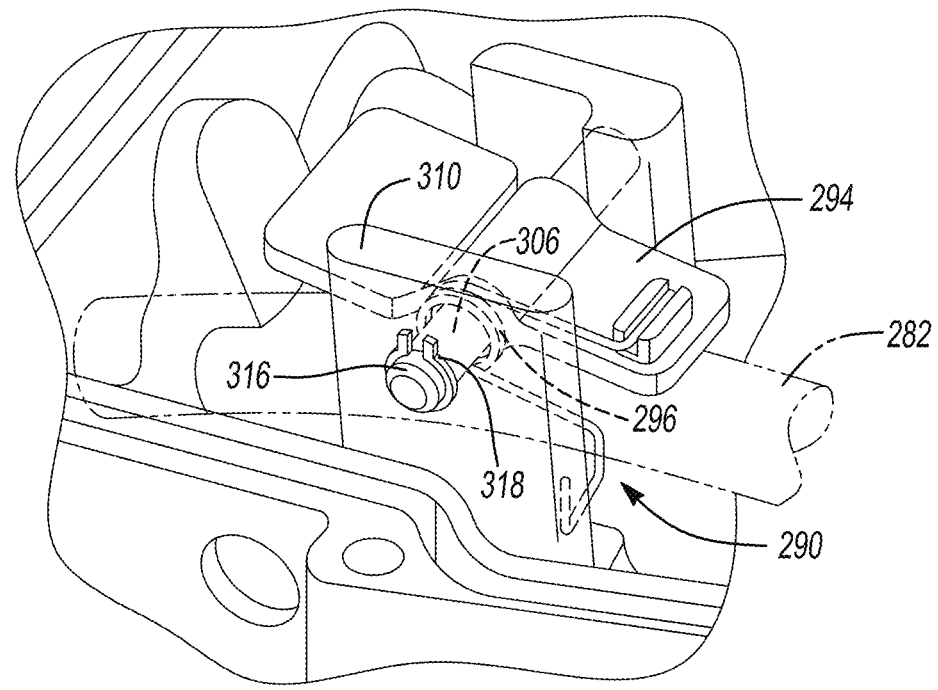

The lever 294 can be formed of an appropriate plastic material and can be formed in various different ways depending upon a variety of factors, including the volume that is available to package the lever 294 into the vehicle drive unit 10. In the example shown, the lever 294 includes first and second lever portions 300 and 302, respectively, that are disposed on opposite sides of a pivot hub 304. The pivot hub 304 is hollow and receives a pivot pin 306 therethrough. The pivot pin 306 extends into pin holes that are formed into the sidewalls 310 of the channel 290 in the motor portion 42 when the lever 294 is disposed between the sidewalls 310. The pivot pin 306 can be secured to the motor portion 42 in any desired manner. In the example of FIG. 8 for example, the pivot pin 306 could be configured as an axle and can have circumferential grooves 316 in one or both ends that receive external snap rings 318. The snap rings 318 can abut the sidewalls 310 to inhibit or limit axial sliding movement of the pivot pin 306 in the holes in the sidewalls 310. Returning to FIGS. 6 and 7, the pivot pins 306 could additionally or alternative be formed with heads 320 that are relatively larger in diameter than the hole in an associated one of the sidewalls 310. In the particular example provided, the pivot pin 306 has a head 320 on one end and a plurality of threads (not specifically shown) on an opposite end. The threaded end of the pin 306 is inserted through the hole in one sidewall 310, through the pivot hub 304 and is threaded into the hole in the opposite sidewall 310.

The torsion spring 296 is configured to bias the lever 294 about the pivot pin 306 into an interlock position that is shown in FIG. 7. When the lever 294 is in the interlock position, the first lever portion 300 closes the exterior side of the channel 290, while the second lever portion 302 is in an elevated position that inhibits the abutment of the cover 292 to a mounting flange 330 on the motor portion 42. In the example provided, the channel 290 is formed by an inner housing assembly 336 that is part of the motor portion 42 and shrouds a power terminal 338 to which the battery lead 282 is to be coupled.

The lever 294 can be pivoted manually about the pivot pin 306 to uncover the channel 290 and permit the battery lead 282 to be inserted through the channel 290 and mounted to the power terminal 338 as is shown in FIGS. 6 and 12. Prior to the installation of the cover 292 to the motor portion 42, the first lever portion 300 can contact the battery lead 282, to inhibit the torsion spring 296 from returning the lever 294 to the interlock position.

Figure 9:
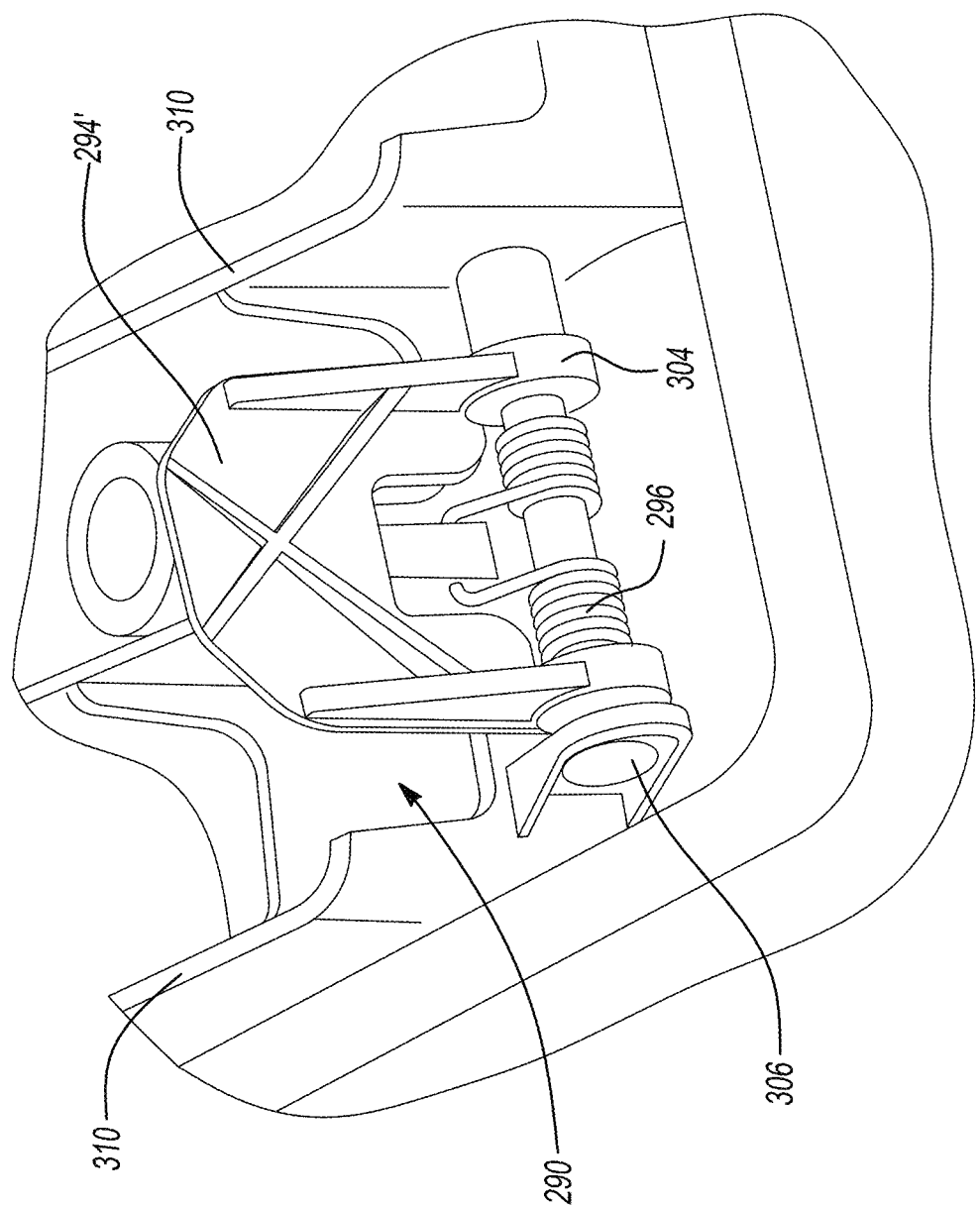
FIG. 9 is a perspective view of an alternately configured blocking member.

While the lever 294 has been described as including a pair of lever portions that are disposed on opposite sides of a pivot hub 304, it will be appreciated that the lever could be formed somewhat differently. With reference to FIG. 9, the lever 294' could include a single lever portion that extends from the pivot hub 304. In this example, the pivot hub 304' is formed as a yoke, the torsion spring 296 is mounted between the ears of the yoke, and the pivot hub 304' and pivot pin 306 are disposed relative to the channel 290 so that the lever 294 is biased upwards to not only block the channel 290 but also to inhibit the cover 292 (FIG. 6) from being secured to the mounting flange 330 (FIG. 6).

While a single lever 294 has been illustrated and described, it will be appreciated that additional levers 294 could be incorporated into the interlock. In the particular example provided, a seal boot that sealingly engages the motor portion 42 of the housing 12 fixedly couples the several battery leads 282 to one another, which essentially necessitates the simultaneous insertion of all of the battery leads 282 into respective channels 290 at the same time. Consequently, a single lever 294 can optionally be employed (rather than a lever 294 for each battery lead 282) because the presence of a single battery lead 282 through a channel 290 to pivot the lever 294 infers the presence of all battery leads 282 in their respective channels 290. Alternatively, multiple levers 294 or other blocking members could be employed.

It will also be appreciated that while various pivoting levers 294, 294' have been illustrated and described, the blocking member need not pivot relative to the motor portion 42 of the housing 12. In this regard, the blocking member could translate relative to the motor portion 42 between a first position, which provides access for a battery lead 282 through the channel 290, and a second position that blocks access through the channel 290 for the battery lead 282.

Figure 10:
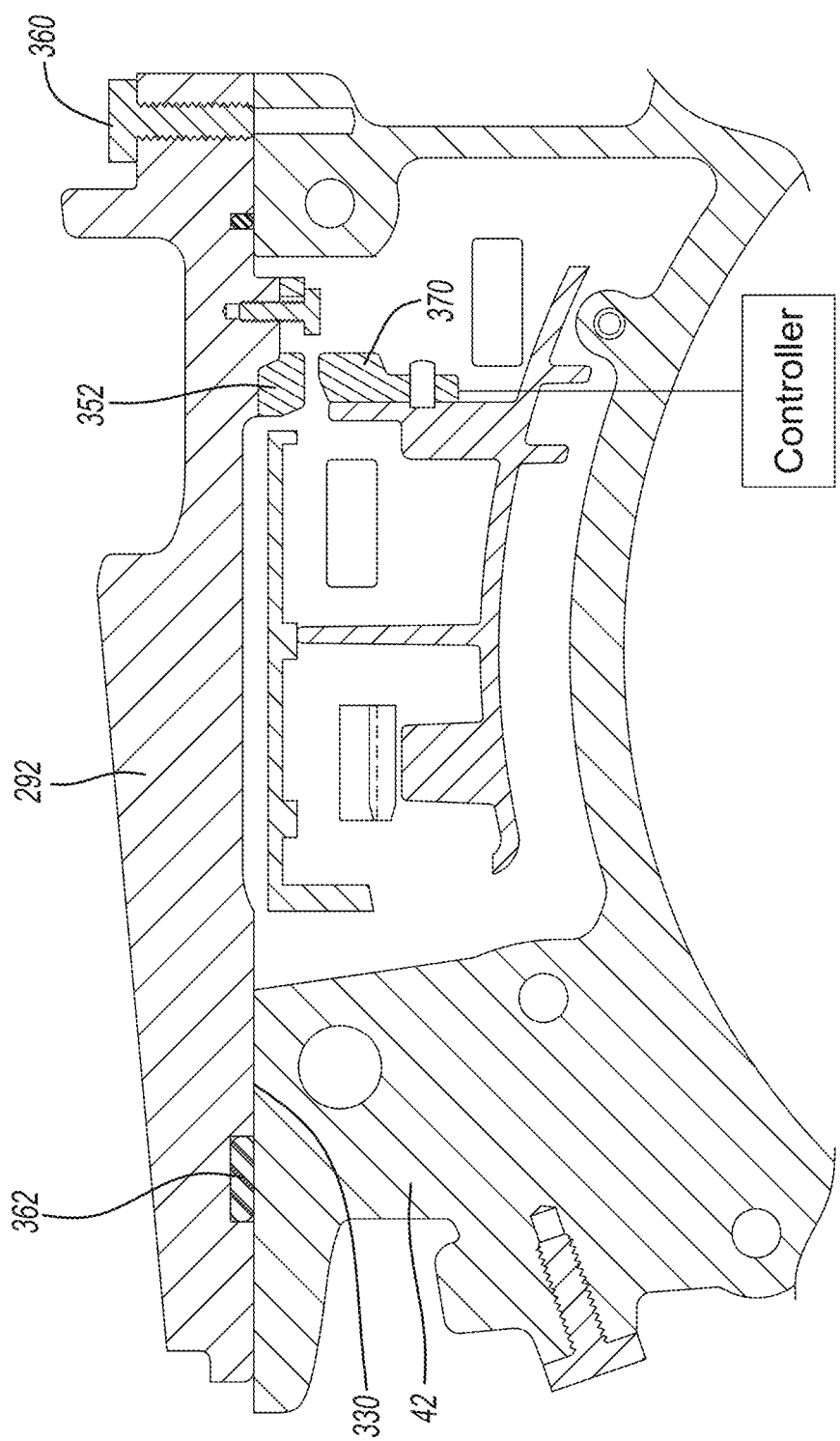
FIG. 10 is a section view of a portion of the vehicle drive unit of FIG. 1, the view illustrating another portion of the interlock.

With reference to FIGS. 6, 10 and 11, the cover 292 has a lever engagement 350 and a magnet 352. With the first lever portion 300 contacting the battery lead 282 so that the lever 294 is pivoted substantially from the interlock position, the cover 292 can be disposed against the mounting flange 330 on the motor portion 42 and can be removably coupled to the motor portion 42 via a plurality of threaded fasteners 360. A gasket 362 can be disposed between the cover 292 and the mounting flange 330 on the motor portion 42 to seal the interface between the cover 292 and the mounting flange 330. With the cover 292 secured to the mounting flange 330 in this manner, the lever engagement 350 can be in contact with the second lever portion 302 to position the lever 294 about the pivot pin 306 such that the first lever portion 300 does not touch or engage the battery lead 282. The magnet 352 on the cover 292 is positioned proximate a sensor 370 that is mounted to the motor portion 42. The sensor 370 is configured to sense the presence of the magnet 352 and to responsively generate a sensor signal that is transmitted to a controller 372. The controller 372 can be configured to inhibit the supply of electrical power unless the sensor signal is transmitted by the sensor 370 to the controller 372.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle drive unit comprising:
   a housing having a motor portion that defines a channel and a mounting flange;
   an electric motor coupled to the motor portion of the housing;
   a power terminal disposed in the channel in the motor portion;
   a cover that is removably coupled to the motor portion to cover at least a portion of the channel to inhibit access to the power terminal, the cover being configured to seat against or proximate the mounting flange when coupled to the motor portion;
   an electric lead that is received in the channel and electrically coupled to the power terminal;
   a blocking member coupled to the motor portion, the blocking member being movable relative to the motor portion between a first position, which at least partially blocks access of the electric lead to the power terminal through the channel and projects from the motor portion to inhibit the cover from being coupled to the motor portion, and a second position which permits access of the electric lead to the power terminal through the channel and is oriented to permit the cover to be coupled to the motor portion;
   a differential assembly received in the housing, the differential assembly having a differential input member and a pair of differential output members;
   a pair of shafts, each of the shafts being driven by a respective one of the differential output members; and
   a transmission disposed in the housing, the transmission transmitting rotary power between the electric motor and the differential input member.

2. The vehicle drive unit of claim 1, further comprising a sensor target coupled to the cover and a sensor coupled to the motor portion of the housing, the sensor being configured to sense the sensor target when the cover is coupled to the motor housing and to responsively generate a sensor signal.

3. The vehicle drive unit of claim 1, wherein the cover abuts the mounting flange.

4. The vehicle drive unit of claim 1, wherein the electric lead comprises a mount, wherein the mount of the electric lead is coupled to the motor portion to close an end of the channel.

5. The vehicle drive unit of claim 1, wherein the blocking member comprises a lever that is pivotably coupled to the motor portion.

6. The vehicle drive unit of claim 5, wherein the lever comprises a first lever portion, a second lever portion, and a pivot hub that is disposed between the first and second lever portions, wherein when the first portion extends into the channel when the lever is in the first position.

\* \* \* \* \*